INVENTOR.
R. W. WOLLENTIN.
BY
ATTORNEY

United States Patent Office 2,780,600
Patented Feb. 5, 1957

2,780,600

LEAD- AND MANGANESE-ACTIVATED CADMIUM-SODIUM FLUOROPHOSPHATE PHOSPHOR

Robert W. Wollentin, Bloomfield, N. J., assignor to Westinghouse Electric Corporation, East Pittsburgh, Pa., a corporation of Pennsylvania Application January 24, 1955, Serial No. 483,617

4 Claims. (Cl. 252—301.6)

This invention relates to luminescent materials and, more particularly, to luminescent materials having a predominantly red color when irradiated by 2537 A. U.

It is the general object of this invention to provide a lead- and manganese-activated cadmium-sodium fluorophosphate luminescent material which will have a predominantly red color when irradiated by 2537 A. U.

It is another object to provide optimum and permissible ranges for the raw-mix components of the phosphor and to provide a method of making same.

The aforesaid objects of the invention, and other objects which will become apparent as the description proceeds, are achieved by providing a lead- and manganese-activated cadmium-sodium fluorophosphate luminescent material wherein the molar ratio of cadmium orthophosphate to sodium fluoride is from 3:2.5 to 3:5.5 and the lead and manganese activators are maintained within allowable ranges.

For a better understanding of the invention, reference should be had to the accompanying drawing wherein.

Figure 1:
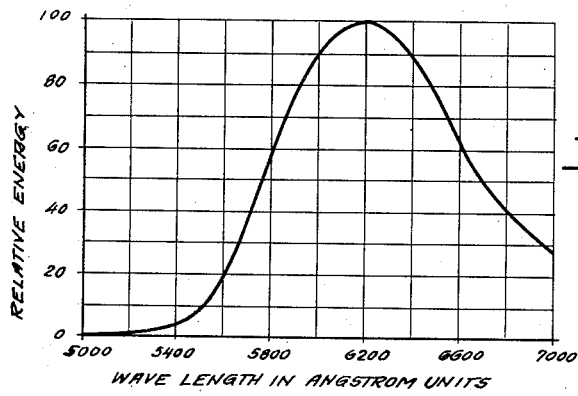
Fig. 1 is a spectral distribution curve of relative energy vs. wave length in Angstrom units for the preferred embodiment of the phosphor of this invention.

With specific reference to the spectral distribution curve illustrated in Fig. 1, the cadmium-sodium fluorophosphate luminescent material has in its preferred form a spectral distribution which is peaked at about 6200 A. U. In this spectral distribution curve the most intense increment of observed value of radiation is arbitrarily set at a relative energy or relative value of 100 and the remaining measured increments of the spectral distribution are correlated to this value of 100 and plotted accordingly.

Figure 2:
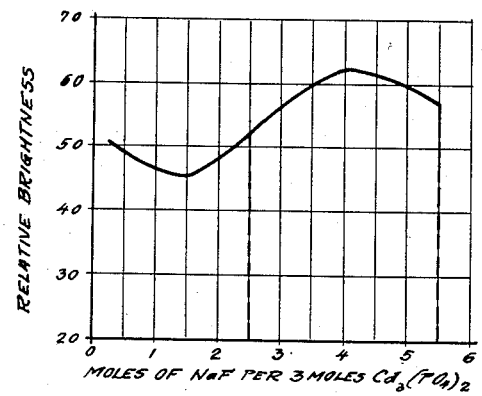
Fig. 2 is a graph representing relative brightness vs. moles of sodium fluoride per 3 moles of cadmium orthophosphate for cadmium-sodium fluorophosphate phosphor activated by manganese and lead.
Figure 3:
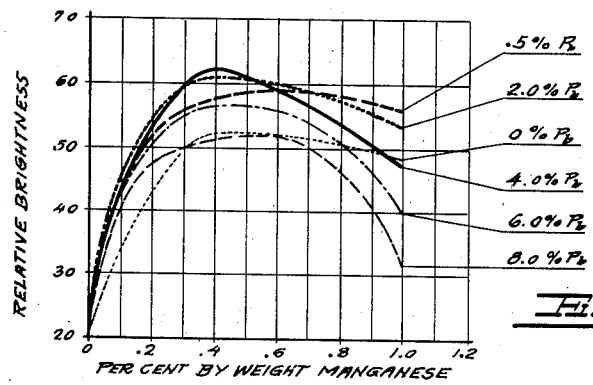
Fig. 3 is a graph representing relative brightness vs percent manganese by weight of cadmium orthophosphate for cadmium-sodium fluorophosphate in which the amounts of lead activator are also varied.

The preferred embodiment for the cadmium-sodium fluorophosphate luminescent material has the general formulation: $3Cd_3(PO_4)_2 \cdot 4NaF:0.4\%$ Mn:4%Pb, with an excess of from 1 to 50 molar percent of $P_2O_5$. It should be noted that all activator percentages and molar excess of $P_2O_5$ are with respect to the cadmium orthophosphate. The effect of varying the moles of sodium fluoride per 3 moles of cadmium orthophosphate are illustrated in Fig. 2 wherein a peak in relative brightness is observed when the molar ratio of cadmium orthophosphate to sodium fluoride is 3 to 4. The limitations in permissible molar ratios of cadmium orthophosphate to sodium fluoride are indicated in dotted lines as being from 3 to 2.5 to 3 to 5.5. These permissible limitations are selected on a purely arbitrary basis from brightness data which is represented in the curve in Fig. 2, the selection being governed by what constitutes a commercially acceptable and competitive phosphor. It should be noted that the relative brightness measurements as indicated in Figs. 2 and 3 were made with a Weston type 3 "Photronic Cell," equipped with an eye sensitivity filter so that the photocell sensitivity was substantially the same as the sensitivity of the eye. As illustrated in Fig. 2, where the cadmium orthophosphate to sodium fluoride ratio is 3 to 2.5, the phosphor will have a relative brightness of about 52 rising to a maximum brightness of 62½ at a ratio of 3 to 4 and thereafter decreasing to a relative brightness of about 57 at a ratio of 3 to 5.5.

In Fig. 3 is illustrated how the phosphor brightness is varied by varying the activator percentages where the cadmium orthophosphate and sodium fluoride are present in optimum molar proportions. Based on the relative brightness obtained, and arbitrarily basing the permissible activator proportions on these observed brightnesses, as dictated by what constitutes a commercially acceptable phosphor, it has been found that the percent by weight of manganese activator should be at least 0.1% by weight and not more than 1% by weight of the cadmium orthophosphate with the optimum output occurring at about 0.4% of manganese by weight. The permissible range of lead activator is from 0.5% to 7% by cadmium orthophosphate weight and the optimum output occurs at 4% with the manganese activator present in optimum proportions. If the percent by weight of the manganese activator is without the heretofore given range, the phosphor brightness will not be satisfactory for the usual application in gas-discharge lamps. If the percent by weight of lead activator is below the heretofore given allowable range, the phosphor emission peak will tend to shift to the left and if the percent by weight of the lead activator is above the aforementioned permissible range, the phosphor when fired will tend to sinter excessively. In addition, the phosphor color changes from white to gray with excessive lead activator concentrations which gray color decreases the phosphor efficiency. It should be noted that whenever percentages of activator proportions are given, the percentage by weight of cadmium orthophosphate is intended. For example, where 4% by weight of lead activator is referred to, the total weight of metallic lead present is 4% of the weight of the cadmium orthophosphate in the phosphor.

Varying the lead- and manganese-activator concentrations will shift the emission peak somewhat, the greater the concentrations of activator, the further the emission peak is shifted to the right. There is shown in the following table, indicated as Table I, the effect of varying the lead and manganese concentrations, and as will be observed the emission peak occurs at 6200 A. U. for the optimum proportions of activator, which emission peak is indicated as λ max. It should be noted that increasing the lead and manganese activator concentrations will shift the emission peak to the right of 6200, i. e. toward the longer wave lengths, which shift is desirable to increase further the percentage of red radiation. However, the relative brightness is considerably decreased from the relative brightness of a phosphor having the optimum activator concentrations.

TABLE I

*Effect of activator concentration on emission peak of $3Cd_3(PO_4)_2 \cdot 4NaF:Mn:Pb$*

| Percent Mn | Percent Pb | λ max |
|---|---|---|
| 0.2 | 0.5 | 6,160 |
| 0.4 | 0.5 | 6,180 |
| 0.8 | 0.5 | 6,200 |
| 0.2 | 2.0 | 6,160 |
| 0.8 | 2.0 | 6,200 |
| 0.2 | 4.0 | 6,160 |
| 0.4 | 4.0 | [1] 6,200 |
| 0.6 | 4.0 | 6,220 |
| 0.8 | 4.0 | 6,250 |
| 0.2 | 6.0 | 6,190 |
| 0.8 | 6.0 | 6,250 |
| 0.2 | 8.0 | 6,190 |
| 0.8 | 8.0 | 6,250 |
| 1.0 | 0 | 6,170 |
| 1.0 | 4.0 | 6,230 |
| 1.0 | 8.0 | 6,250 |

[1] Preferred embodiment.

NOTE.—Activators are expressed in percent by weight of cadmium orthophosphate.

In preparing the preferred embodiment of the lead- and manganese-activated cadmium-sodium fluorophosphate luminescent material of this invention, the following raw-mix components may be mixed in proportions as given below.

Example I

| Component: | Moles |
|---|---|
| CdO | 9.0 |
| $(NH_4)_2HPO_4$ | 7.5 |
| NaF | 4.0 |
| $MnCO_3$ | 0.115 |
| $Pb(NO_3)_2$ | 0.305 |

The above raw materials are thoroughly mixed by ball-milling or other conventional mixing techniques and, as an example, a mixing time of 30 minutes is generally satisfactory. The ballmilling may be followed by a ten minute hammermilling and another 20 minutes of ball-milling if desired. These mixing times are more a matter of choice and are not critical, and are only given as an example. The mixed, blended raw materials are then placed in covered silica trays and fired in an air atmosphere at between 450° C. to 600° C. for one or more hours, and as a specific example, the phosphor may be fired at 580° C. for one hour. A second milling and firing cycle, similar to that as heretofore given, may be desired in order to insure a complete reaction of the raw materials, although the second milling and firing cycle is not necessary.

Many different raw-mix materials may be substituted for the materials given in the foregoing example and the resulting luminescent material will be the same. Broadly, the raw-mix materials may be broken down into four main categories. Cadmium- and phosphorus- and oxygen-containing material which when fired will form $Cd_3(PO_4)_2$ with an excess of from 1 to 50 molar percent of $P_2O_5$ over the total moles of $Cd_3(PO_4)_2$ which would be formed if all of the cadmium were present as the orthophosphate. The optimum excess of $P_2O_5$ present in the raw mix is 25 molar percent. In other words, if there are 9 moles of CdO and 7.5 moles of $$(NH_4)_2—HPO_4$$

in the raw mix and these components are suitably mixed and then fired, the resulting compound may be expressed as 3 moles of $Cd_3(PO_4)_2$ with an excess of 0.75 mole of $P_2O_5$. Actually this $P_2O_5$ must be chemically combined with the cadmium as metaphosphate, orthophosphate and various intermediate complexes. However, a chemical analysis will show only so much CdO and so much $P_2O_5$, without showing how these oxides are combined. Thus a representation of so much $Cd_3(PO_4)_2$ with so much excess of $P_2O_5$ is accurate from an analytical standpoint and enables the compound to be identified accurately. Also for the purposes of identifying the raw-mix components, it is immaterial just how these combine on firing, as long as the desired excess of phosphate is present. It is, of course, understood that the $Cd_3(PO_4)_2$ forming material should be free from non-volatile constituents other than the essential elements constituting the phosphor, namely cadmium, fluorine, phosphorus, oxygen, manganese, lead and sodium. Second, a sodium- and fluorine-containing material which will form sodium fluoride on firing, and which material is free from non-volatile constituents other than the essential elements of the phosphor. Third, a lead-containing material which will form lead oxide or lead phosphate on firing and which material is free from non-volatile constituents other than the essential elements of the phosphor. Fourth, a manganese-containing material which will form either manganese oxide or manganese phosphate on firing and which manganese-containing material is free from non-volatile constituents other than the essential elements of the phosphor. When the aforementioned products of formation of the raw materials, for example, MnO or $Mn_3(PO_4)_2$ are referred to, it is not meant that such compounds actually exist as such in the fired and prepared phosphors. What is meant is that raw-mix materials which can form these products when fired individually will be satisfactory as raw-mix components for the luminescent material of this invention. Following are four tables in which are listed raw-mix components which may be used to form the phosphor. These tables are broken down as follows: Table II lists cadmium orthophosphate and excess $P_2O_5$ forming materials; Table III lists sodium fluoride forming materials; Table IV lists lead oxide and lead phosphate forming materials; Table V lists manganese oxide and manganese phosphate forming materials. Any of the individual cadmium orthophosphate forming compounds as given in Table II may be mixed with any of the individual sodium fluoride forming compounds as given in Table III, plus any of the lead oxide or lead phosphate forming compound as given in Table IV plus any of the manganese oxide or manganese phosphate forming compounds as given in Table V in order to form a suitable raw-mix composition for the phosphor, provided the proportions of one component with respect to the other components are maintained in the same proportions as are given under the columns headed "Molar Ratios."

TABLE II

Cd₃(PO₄)₂ forming materials

| Compound (numerical designation and optimum specific examples in moles) | Molar Ratios | |
|---|---|---|
| | Minimum moles phosphate containing material | Maximum moles phosphate containing material |
| (1) 3Cd₃(PO₄)₂+1.5(NH₄)₂HPO₄ | .06(NH₄)₂HPO₄ | 3(NH₄)₂HPO₄ |
| (2) 9CdO+7.5(NH₄)₂HPO₄ | 6.06 | 9 |
| (3) 9CdCO₃+7.5(NH₄)₂HPO₄ | 6.06 | 9 |
| (4) 9CdNO₃·4H₂O+7.5(NH₄)₂HPO₄ | 6.06 | 9 |
| (5) 9CdC₂O₄·3H₂O+7.5(NH₄)₂HPO₄ | 6.06 | 9 |
| (6) 9Cd(C₂H₃O₂)₂·3H₂O+7.5(NH₄)₂HPO₄ | 6.06 | 9 |
| (7) 9Cd(OH)₂+7.5(NH₄)₂HPO₄ | 6.06 | 9 |
| (8) 9CdO+3.75P₂O₅ | 3.03 | 4.5 |
| (9) 9CdO+7.5H₃PO₄ | 6.06 | 9 |
| (10) 9CdO+7.5NH₄H₂PO₄ | 6.06 | 9 |

NOTE.—Any of the Cd compounds above can be used with P₂O₅ or H₃PO₄ or NH₄H₂PO₄. Also, a part of the excess P₂O₅ may be supplied from the lead- and manganese-containing materials noted in Tables IV and V.

TABLE III

NaF forming materials

| Compound (numerical designation and optimum specific example in moles) | Molar Ratios | |
|---|---|---|
| | Minimum | Maximum |
| (11) 4NaF | 2.5 | 5.5 |
| (12) 2(Na₂+2NH₄F) | 1.25 | 2.75 |
| (13) 2(Na₂CO₃+2NH₄F) | 1.25 | 2.75 |
| (14) 4(NaNO₃+NH₄F) | 2.5 | 5.5 |
| (15) 2(Na₂C₂O₄·2NH₄F) | 1.25 | 2.75 |
| (16) 4(NaC₂H₃O₂+NH₄F) | 2.5 | 5.5 |
| (17) 4(NaOH+NH₄F) | 2.5 | 5.5 |
| (18) 4(NaHCO₃+NH₄F) | 2.5 | 5.5 |

TABLE IV

PbO,Pb₃(PO₄)₂ forming materials

| Compound (numerical designation and optimum specific example in moles) | Molar Ratios | |
|---|---|---|
| | Minimum | Maximum |
| (19) 0.306PbO | 0.038 | 0.54 |
| (20) 0.306PbCO₃ | 0.038 | 0.54 |
| (21) 0.306Pb(NO₃)₂ | 0.038 | 0.54 |
| (22) 0.4022PbCO₃·Pb(OH)₂ | 0.013 | 0.18 |
| (23) 0.306Pb(C₂H₃O₂)₂·3H₂O | 0.038 | 0.54 |
| (24) 0.306Pb Halides (i. e., F, Cl, Br, I) | 0.038 | 0.54 |
| (25) 0.306Pb(OH)₂ | 0.038 | 0.54 |
| (26) 0.106Pb₃O₄ | 0.013 | 0.18 |
| (27) 0.158Pb₂O₃ | 0.019 | 0.27 |
| (28) 0.306PbO₂ | 0.038 | 0.54 |
| (29) 0.106Pb₃(PO₄)₂ | 0.013 | 0.18 |
| (30) All of Pb compounds of 19, 20, 21, 22, 23, 24, 25+(NH₄)₂HPO₄ in molar amounts as indicated. | | |
| (31) All of Pb compounds of 19, 20, 21, 22, 23, 24, 25+H₃PO₄ in molar amounts as indicated. | | |
| (32) All of Pb compounds of 19, 20, 21, 22, 23, 24, 25+NH₄H₂PO₄ in molar amounts as indicated. | | |
| (33) All of Pb compounds of 19, 20, 21, 22, 23, 24, 25+P₂O₅ in molar amounts as indicated. | | |

NOTE.—0.306 mole Pb in Example 20 is equivalent to 4% Pb by weight of cadmium orthophosphate in preferred phosphor as given in Example 1. Also, in Examples 30-33 (inclusive) the additional phosphate-containing reactants should be used in amounts sufficient to stoichiometrically combine with the lead-containing reactants.

TABLE V

MnO,Mn₃(PO₄)₂ forming materials

| Compound (numerical designation and moles of optimum specific example) | Molar Ratios | |
|---|---|---|
| | Minimum | Maximum |
| (34) 0.115MnO | 0.029 | 0.29 |
| (35) 0.038Mn₃(PO₄)₂ | 0.010 | 0.10 |
| (36) 0.115MnCl₂·4H₂O | 0.029 | 0.29 |
| (37) 0.115MnCO₃ | 0.029 | 0.29 |
| (38) 0.115MnF₂ | 0.029 | 0.29 |
| (39) 0.115MnBr₂ | 0.029 | 0.29 |
| (40) 0.115MnI₂ | 0.029 | 0.29 |
| (41) 0.115Mn(NO₃)₂ | 0.029 | 0.29 |
| (42) 0.115MnC₂O₄ | 0.029 | 0.29 |
| (43) 0.115Mn(C₂H₃O₂)₂·4H₂O | 0.029 | 0.29 |
| (44) 0.115Mn(OH)₂ | 0.029 | 0.29 |
| (45) 0.115MnC₄H₄O₆ | 0.029 | 0.29 |

NOTE.—0.115 mole Mn in Example 34 is equivalent to 0.4% Mn by weight of cadmium orthophosphate in preferred phosphor as given in Example 1.

It will be recognized that the possible combinations of raw-mix components included under the foregoing Tables II–V are numerous and each of these plurality of raw-mix combinations are satisfactory for forming the luminescent material of this invention. Also, the components listed under the foregoing tables are by no means complete, but are only indicative of what constitutes satisfactory raw-mix components.

It should be understood that the molar ratios as given in Tables II–V will all produce an equivalent amount of the desired material. For example, 0.158 mole of Pb₂O₃ (see numerical designation 27) will contain the same amount of lead as 0.306 mole of PbCO₃ (see numerical designation 20).

It will be recognized that the objects of the invention have been achieved by providing a lead- and manganese-activated cadmium-sodium fluorophosphate luminescent material having a radiation which is peaked at about 6200 when irradiated by 2537 A. U. In addition, there are provided optimum and permissible ranges for the raw-mix components of the material in addition to a method of making same.

As a possible alternative embodiment, potassium fluoride may be substituted for the sodium fluoride to produce luminescent material having a predominantly red output.

While in accordance with the patent statutes one best known embodiment of the invention has been illustrated and described in detail, it is to be particularly understood that the invention is not limited thereto or thereby.

I claim:

1. A luminescent material having the general formulation $3Cd_3(PO_4)_2 \cdot xNaFyMn:zPb$, where $x$ is not less than 2.5 moles and not more than 5.5 moles, $y$ is not less than 0.1% by weight and not more than 1% by weight of cadmium orthophosphate, $z$ is not less than 0.5% and not more than 7% by weight of cadmium orthophosphate, and there is chemically combined with said luminescent material from 1 to 50 molar percent of excess $P_2O_5$ over the total moles of cadmium orthophosphate.

2. The method of preparing a lead- and manganese-activated cadmium-sodium fluorphosphate luminescent material having as essential elements Cd, F, P, O, Na, Mn and Pb, comprising mixing the following raw mix components: cadmium- and phosphorus- and oxygen-containing material which on firing will form $Cd_3(PO_4)_2$ with an excess of $P_2O_5$ and which material is free from non-volatile constituents other than said essential elements; sodium- and fluorine-containing material which will form NaF and which material is free from non-volatile constituents other than said essential elements; manganese-containing material which will form one of the group consisting of MnO and $Mn_3(PO_4)_2$ and which manganese-containing material is free from non-volatile consitutents other than said essential elements; and lead-containing material which will form one of the group consisting of PbO and $Pb_3(PO_4)_2$ and which lead-containing material is free from non-volatile constituents other than said essential elements, said essential element-containing materials being present in the following stated proportions: said $Cd_3(PO_4)_2$ and excess $P_2O_5$ forming material being present in amounts sufficient to form 3 moles of $Cd_3(PO_4)_2$ and an excess of from 1 to 50 molar percent of $P_2O_5$; said NaF forming material being present in amounts sufficient to form from 2.5 to 5.5 moles NaF; said manganese-containing material being present in amounts sufficient to produce from 0.029 mole to 0.29 mole MnO; said lead-containing material being present in amounts sufficient to produce from 0.038 mole to 0.54 mole PbO; the total excess of said $P_2O_5$ not exceeding 50 molar percent of the cadmium orthophosphate; milling the foregoing raw-mix components, and firing said milled raw-mix components at from 450° C. to 600° C. for at least one hour.

3. The method of preparing a lead- and manganese-activated cadmium-sodium fluorophosphate luminescent material having as essential elements Cd, F, P, O, Na, Mn and Pb, comprising mixing the following raw mix components: cadmium- and phosphorus- and oxygen-containing material which on firing will form $Cd_3(PO_4)_2$ with an excess of $P_2O_5$ and which material is free from non-volatile constituents other than said essential elements; sodium- and fluorine-containing material which will form NaF and which material is free from non-volatile constituents other than said essential elements, manganese-containing material which will form one of the group consisting of MnO and $Mn_3(PO_4)_2$ and which manganese-containing material is free from non-volatile constituents other than said essential elements; and lead-containing material which will form one of the group consisting of PbO and $Pb_3(PO_4)_2$ and which lead-containing material is free from non-volatile constituents other than said essential elements, said essential element-containing materials being present in the following stated proportions: said $Cd_3(PO_4)_2$ and excess $P_2O_5$ forming material being present in amounts sufficient to form 3 moles of $Cd_3(PO_4)_2$ and an excess of about 25 molar percent of $P_2O_5$; said NaF forming material being present in amounts sufficient to form about 4 moles NaF; said manganese-containing material being present in amounts sufficient to produce about 0.115 mole MnO; said lead-containing material being present in amounts sufficient to produce about 0.306 mole PbO; milling the foregoing raw-mix components, and firing said milled raw-mix components at from 450° C. to 600° C. for at least one hour.

4. The method of preparing a luminescent material comprising mixing the following raw-mix components in the stated proportions: cadmium oxide, 9 moles; diammonium acid phosphate, 7.5 moles; manganous carbonate, 0.115 mole; sodium fluoride, 4 moles; and plumbous nitrate, 0.305 mole; milling the foregoing raw-mix components; and firing said milled raw-mix components at from 450° C. to 600° C. for at least one hour.

References Cited in the file of this patent

UNITED STATES PATENTS

| | | |
|---|---|---|
| 2,214,643 | McKeag | Sept. 10, 1940 |
| 2,476,676 | McKeag | July 19, 1949 |

OTHER REFERENCES

Chem. Abstracts, vol. 49, No. 1, January 10, 1955, page 63.